US012767598B2

(12) United States Patent
Chen et al.

(10) Patent No.: US 12,767,598 B2
(45) Date of Patent: Oct. 20, 2026

(54) CONCRETE PAVING BLOCKS WITH HIGH STRENGTH AND LOW EFFLORESCENCE

(71) Applicant: Nano and Advanced Materials Institute Limited, Hong Kong (HK)

(72) Inventors: Binmeng Chen, Hong Kong (HK); Xuan Liu, Hong Kong (HK); Bin Liu, Hong Kong (HK); Man Lung Sham, Hong Kong (HK)

(73) Assignee: HONG KONG APPLIED SCIENCE AND TECHNOLOGY RESEARCH INSTITUTE COMPANY LIMITED, Hong Kong (HK)

( * ) Notice: Subject to any disclaimer, the term of this patent is extended or adjusted under 35 U.S.C. 154(b) by 576 days.

(21) Appl. No.: 17/984,217

(22) Filed: Nov. 9, 2022

(65) Prior Publication Data

US 2023/0159396 A1 May 25, 2023

Related U.S. Application Data

(60) Provisional application No. 63/278,109, filed on Nov. 11, 2021.

(51) Int. Cl.
*C04B 28/04* (2006.01)
*C04B 14/06* (2006.01)
(Continued)

(52) U.S. Cl.
CPC .............. *C04B 28/04* (2013.01); *C04B 14/06* (2013.01); *C04B 14/22* (2013.01); *C04B 18/167* (2013.01);
(Continued)

(58) Field of Classification Search
CPC ......... C04B 28/04; C04B 14/06; C04B 14/22; C04B 18/167; C04B 2103/30;
(Continued)

(56) References Cited

U.S. PATENT DOCUMENTS 5,284,712 A 2/1994 Kawai et al.
7,771,529 B1 8/2010 McPherson
(Continued)

FOREIGN PATENT DOCUMENTS

CN 109553423 A 4/2019
CN 111056787 A 4/2020
(Continued)

OTHER PUBLICATIONS

FR 3029199 A1_Machine Translation (Year: 2016).*
(Continued)

*Primary Examiner* — Anthony J Green
*Assistant Examiner* — Anastasia A. Kuvayskaya
(74) *Attorney, Agent, or Firm* — IDEA Intellectual Limited; Sam T. Yip

(57) ABSTRACT

Efflorescence resistance of concrete blocks is enhanced through the use of glass powder in the concrete composition. The glass powder permits a reduction in the cement content; the glass powder also creates a pozzolanic reaction to change the free calcium ions in calcium hydroxide to calcium silicate to fix the calcium ions inside concrete. The composition includes cementitious binding material of ordinary Portland cement, fly ash, calcium sulfoaluminate cement, ground-granulated blast-furnace slag in an amount from 20 to 25 wt. %. Coarse aggregate is provided from 10 to 15 wt. percent. Fine aggregate is from 32 to 39 wt. %. The composition further includes glass powder having a diameter of less than approximately 75 microns in an amount from 17 to 23 wt. %. Water is present in an amount from 6 to 9 wt. %. The dry density of formed paving blocks is 1800-2200 kg/m$^3$.

8 Claims, 10 Drawing Sheets

(51) Int. Cl.
*C04B 14/22* (2006.01)
*C04B 18/167* (2023.01)
*C04B 103/30* (2006.01)
*C04B 111/21* (2006.01)

(52) U.S. Cl.
CPC ....... *C04B 2103/30* (2013.01); *C04B 2111/21* (2013.01)

(58) Field of Classification Search
CPC ......... C04B 2111/21; C04B 2111/0075; C04B 2201/20; C04B 28/08; C04B 28/001; C04B 28/021; C04B 28/065; Y02W 30/91
See application file for complete search history.

(56) References Cited

U.S. PATENT DOCUMENTS

| | | | | |
|---|---|---|---|---|
| 10,662,121 | B1 * | 5/2020 | D'Avela | B29B 7/00 |
| 2003/0041783 | A1 * | 3/2003 | Monawar | C04B 14/22 106/718 |
| 2008/0141907 | A1 * | 6/2008 | Campbell | C04B 28/14 106/695 |

FOREIGN PATENT DOCUMENTS

| | | | | |
|---|---|---|---|---|
| CN | 112142382 | A | 12/2020 | |
| CN | 112679163 | A | 4/2021 | |
| FR | 3029199 | A1 * | 6/2016 | C04B 14/28 |
| WO | WO-2012004335 | A1 * | 1/2012 | C04B 14/22 |

OTHER PUBLICATIONS

ASTM C33_Standard specification for concrete aggregates, retrieved from https://cdn.standards.iteh.ai/samples/116020/4219e665765a45849324f9b4c9206c9f/ASTM-C33-C33M-23.pdf on Apr. 21, 2025 (Year: 2018).*
Office Action of the corresponding China patent application No. 202211409082.6 mailed on Jul. 16, 2024.
Shui Zhonghe et al., "Application of metakaolin in cement based materials.", Wuhan University of Technology Press, Sep. 2021.
Sun Guozhong et al., "The Development of Artificial Marble Made Use of Waste Glasses and Coal Ash.", Qiqihar University, Chemical Industry Times, 2003.
Zhang Lanfang, "Alkali activated slag cement and concrete.", Southwest Jiaotong University Press, Aug. 2018.
Decision of Rejection of the corresponding China patent application No. 202211409082.6 mailed on Mar. 24, 2025.

* cited by examiner

CONCRETE PAVING BLOCKS WITH HIGH STRENGTH AND LOW EFFLORESCENCE

CROSS-REFERENCE TO RELATED APPLICATIONS

The present application claims priority to provisional U.S. Patent Application No. 63/278,109, filed 11 Nov. 2021, the disclosure of which is incorporated by reference herein.

FIELD OF THE INVENTION

The present invention relates to compositions for concrete paving blocks, and more particularly, to compositions for concrete paving blocks with high strength and low efflorescence.

BACKGROUND

Concrete paving blocks are widely used on pedestrian walkways and roadways. Mechanical properties are essential criteria to evaluate concrete block performance. In particular, the strength of concrete blocks is paramount. While increasing the amount of cement in a concrete composition can improve the compressive strength, it generally increases the cost and accelerates efflorescence. Efflorescence of cement-based materials typically occurs when the material is exposed to high moisture levels. Water containing dissolved mineral salts reaches the surface of the concrete; as the water evaporates, the salts are left on the surface. The deposit of mineral salts is usually whitish in color and not readily removable. Although it is not an indication of internal damage, it is aesthetically undesirable and can incur economic losses due to product rejection. This can be a persistent problem, especially for pigmented blocks, because of an intense colour contrast between the deposit and the block color.

Of all dry cast products, concrete paving blocks (CPBs) are the most affected by efflorescence. As the block sets or hardens, free calcium hydroxide is formed which is soluble in water even if only to a slight extent. Consequently, it migrates to the concrete block surface either after already being dissolved in the mixing water of the fresh concrete, or through the hardened concrete when exposed to the effects of rain or dew. Having reached the surface of the concrete, the calcium hydroxide reacts with carbon dioxide in the air to form water-insoluble calcium carbonate. Below is the chemical reaction of efflorescence:

$$Ca(OH)_2 + CO_2 \rightarrow CaCO_3 + H_2O \rightarrow \text{Evaporate} = \text{efflorescence}$$

Generally, there are two types of efflorescence, primary and secondary efflorescence. The difference lies in the origin of the substance which leads to the incurred efflorescence. The elements derived from ingredients of the original material result in the primary efflorescence after the production of concrete within a limited time; environmental conditions are responsible for secondary efflorescence, such as water in the form of rain, ice, or dew, or other liquid exposure.

Thus, there is a need in the art for improved compositions that have sufficient strength and reduced efflorescence. Such compositions could be used for high strength concrete paving blocks with long lifespans.

SUMMARY OF THE INVENTION

The present invention enhances the efflorescence resistance of concrete blocks through the use of glass powder in the concrete composition. The glass powder permits a reduction in the cement content; the glass powder also creates a pozzolanic reaction to change the free calcium ions in calcium hydroxide to calcium silicate to fix the calcium ions inside concrete. This prevents the reaction between calcium hydroxide and carbon dioxide in the air that creates the efflorescence.

In one aspect the invention provides an efflorescence-resistant concrete paving block composition including a cementitious binding material of ordinary Portland cement (OPC), fly ash, calcium sulfoaluminate cement (CSA), ground-granulated blast-furnace slag (GGBS), metakaolin (MK), silica fume (SF)or mixtures thereof. The composition further includes coarse aggregate; at least 90 percent of the coarse aggregate has a diameter of less than approximately 10 mm. Fine aggregate is provided having a diameter of approximately 0.75 to approximately 4.75 mm. The composition also includes glass powder having a diameter of less than approximately 75 microns along with water and an optional superplasticizer. In the composition, a ratio of water to cementitious binder material is 0.2 to 0.5 by weight. A ratio of coarse plus fine aggregate to the cementitious binder material is 2 to 6 by weight. The ratio of fine aggregates to coarse aggregates is 2 to 5 by weight and the dry density of formed paving blocks is 1800-2200 kg/m$^3$.

In another aspect, the present invention provides an efflorescence-resistant concrete paving block composition having a cementitious binding material of ordinary Portland cement (OPC), fly ash, calcium sulfoaluminate cement (CSA), ground-granulated blast-furnace slag (GGBS) in an amount from 20 to 25 wt. %. Coarse aggregate is provided having a diameter less than approximately 10 mm in an amount from 10 to 15 wt. percent. Fine aggregate is provided having a diameter less than approximately 3 mm in an amount from 32 to 39 wt. %. The composition further includes glass powder having a diameter of less than approximately 75 microns in an amount from 17 to 23 (19.9) wt. %. Water is present in an amount from 6 to 9 wt. %; and the dry density of formed paving blocks is 1800-2200 kg/m$^3$.

DETAILED DESCRIPTION

Figure 1:
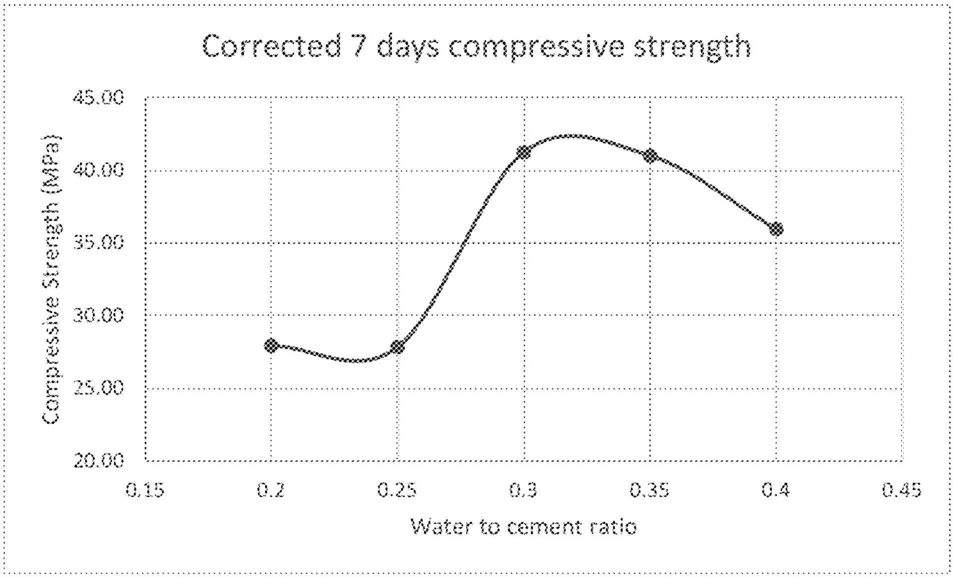
FIG. 1 is a plot of the compressive strength vs. the water to cement ratio.

Masonry and cement-based materials which contain high alkali content are susceptible to efflorescence since soluble salts during hydration are inevitable in the concrete-forming process. To mitigate the efflorescence of concrete paving blocks, the present invention determines an appropriate cement content, water to cement ratio, and permeability. Additionally, as the major source of calcium ion of free $Ca(OH)_2$ is generated from the hydration of cement, the invention provides a mechanism whereby $Ca(OH)_2$ produced by cement can be consumed by a pozzolanic reaction. For the water to cement ratio, minimizing the water to cement ratio can decrease the medium (water) that brings soluble ions to the surface to react with $CO_2$ in the air. Further, a good gradation of the aggregate can enhance the permeability, reducing the pores for soluble salt migration.

In particular, it was determined that the use of glass powder in the concrete composition permits a reduction in the cement content while the glass powder reacts to change the free calcium ions in calcium hydroxide to calcium silicate to fix the calcium ions inside the concrete. This prevents the reaction between calcium hydroxide and carbon dioxide in the air that creates the efflorescence.

Various ratios among different concrete constituents were determined to create an appropriate balance between strength, cost, and efflorescence reduction. In particular, the invention determined the appropriate water to cement ratio, aggregate to cement ratio, fine to coarse aggregate ratio, and glass content.

The resultant composition forms a low efflorescence concrete block. As used herein, the expression "low efflorescence" means that the developed formula caused lower efflorescence than existing plant formulas through conductivity tests and water absorption tests, the conductivity test value can be reduced more than 20% of the existing plant formulas, and water absorption can be reduced to 2.5%, compared with the existing plant formula (3.91%).

Water-to-Cement Ratio

Water is necessary for cement hydration; that is, to complete the chemical reactions necessary to form a strong cement product. The aggregate strength, interfacial bonding strength, and the strength of the cement matrix contributes to the compressive strength of the concrete block formed from the composition. The water-to-cement ratio mainly has an impact on the strength of the cement matrix. Excess water causes strength reduction, drying shrinkage, and loss of abrasive resistance. Low water-to-cement ratio causes insufficient hydration and low workability. Thus, there is an optimal water-to-cement ratio which makes a full coating on the surface of aggregates.

The present invention examined five formulas with water-to-cement ratios of 0.2, 0.25, 0.3, 0.35 and 0.4. 7-day compressive strength was used as an index. According to previous tests, the compressive strength has a relation to the dry density presented by the linear regression equation Y=0.1628X−297.08. The samples have density variations. To eliminate the impact caused by density variations, the present invention transfers the real compressive strength to the compressive strength at a fixed dry density of 2150 $kg/m^3$ by the formula:

$$P_c = P_o + 0.1628 \times (2150 - \rho_o)$$

$P_c$: Converted compressive strength $P_o$: Real compressive strength $\rho_o$: Real dry density Table 1 depicts the water-to-cement ratio for different compositions to determine water-to-cement ratios for use in the compositions of the present invention.

TABLE 1

Water-to-Cement Ratio

| W/C ratio | Binder OPC SCM | Aggregate: Fine aggregate: Glass | Aggregate: Fine aggregate: Coarse sand | Aggregate: Coarse aggregate 10 mm | Water | Admixture Water reducer | Dry density (kg/m3) | 7 Days compressive strength (MPa) | Corrected 7 days compressive strength (MPa) |
|---|---|---|---|---|---|---|---|---|---|
| 0.20 | 912.7 | 520.7 | 1563.3 | 561.7 | 182.5 | 2.8 | 2121.1 | 23.2 | 27.94 |
| 0.25 | 912.7 | 520.7 | 1563.3 | 561.7 | 228.2 | 2.8 | 2169.1 | 31.0 | 27.86 |
| 0.30 | 912.7 | 520.7 | 1563.3 | 561.7 | 273.8 | 2.8 | 2177.9 | 45.8 | 41.26 |
| 0.35 | 912.7 | 520.7 | 1563.3 | 561.7 | 319.5 | 2.8 | 2149.0 | 40.9 | 41.01 |
| 0.40 | 912.7 | 520.7 | 1563.3 | 561.7 | 365.1 | 2.8 | 2199.8 | 44.1 | 35.98 |

A curve of the compressive strength-water to cement ratio is depicted in FIG. 1. When water-to-cement ratio is low, the fluidity is low. The aggregate is not fully coated. Increased water-to-cement ratio enhances the bonding strength. When the water-to-cement ratio is high, the aggregate is fully coated. However, excess water reduces the strength of the cement matrix.

For the compositions tested in FIG. 1, the highest strength water-to-cement ratio was determined to be 0.32.

2. Aggregate-to-Cement Ratio Vs Compressive Strength

Compressive strength is related to both aggregate strength and to the strength of the cement matrix. Aggregates and cement are the main components of solid concrete. To determine the optimum aggregate-to-cement ratio, the total amount of solids remained unchanged while adjusting the amount of cement. Generally, compressive strength increases with increasing cement content. However, excess cement may cause low fluidity as cement consumes most of the water. Table 2 shows the six tested compositions with aggregate-to-cement ratios of 1.5, 2.0, 2.5, 3.0, 3.5 and 4.0.

TABLE 2

| Aggregate to cement ratio: | | | | | | | | | |
|---|---|---|---|---|---|---|---|---|---|
| | | Aggregate (g) | | | Admixture | | 7 Days | Corrected 7 days |
| | | Fine aggregate | | Coarse | | (g) | Dry | compressive | compressive |
| A/C ratio | Binder (g) OPC SCM | Glass | Coarse sand | aggregate 10 mm | Water (g) | Water reducer | density (kg/m3) | strength (MPa) | strength (MPa) |
| 1.5 | 1423.39 | 420.22 | 1261.6 | 453.27 | 228.18 | 2.81 | 2164.1 | 50.01 | 48.72 |
| 2.0 | 1186.16 | 466.91 | 1401.78 | 503.63 | 228.18 | 2.81 | 2162.8 | 51.03 | 48.94 |
| 2.5 | 1016.71 | 500.26 | 1501.90 | 539.61 | 228.18 | 2.81 | 2126.7 | 40.57 | 44.35 |
| 3.0 | 889.62 | 525.27 | 1577 | 566.59 | 228.18 | 2.81 | 2170.0 | 31.10 | 27.85 |
| 3.5 | 790.77 | 544.73 | 1635.41 | 587.57 | 228.18 | 2.81 | 2130.2 | 25.00 | 28.22 |
| 4.0 | 711.70 | 560.29 | 1682.13 | 604.36 | 228.18 | 2.81 | 2101.7 | 19.19 | 27.05 |

Figure 2:
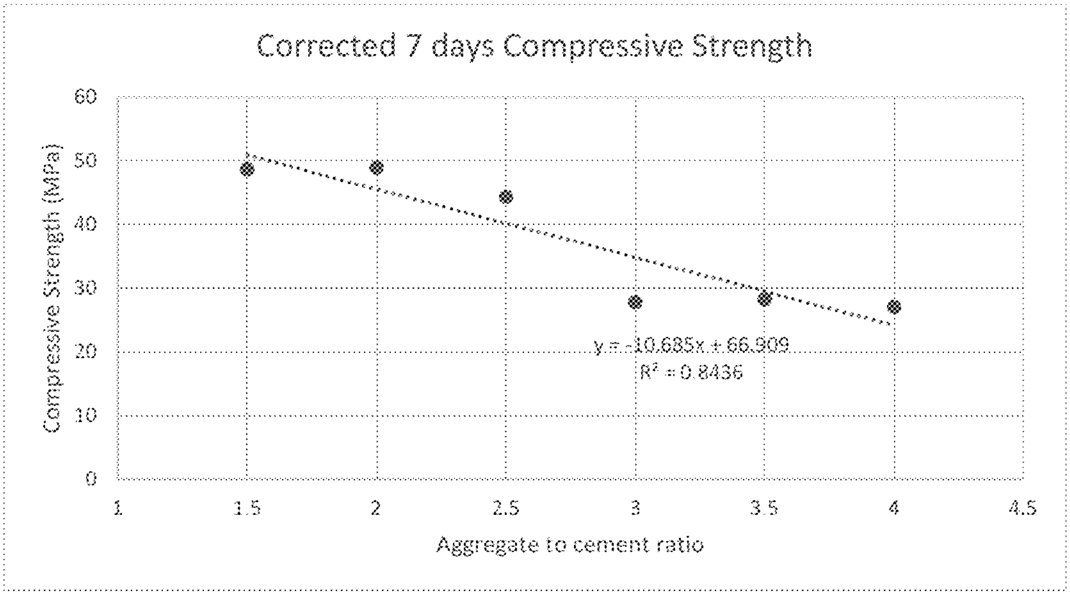
FIG. 2 is a plot of compressive strength vs. the aggregate to cement ratio.

The compressive strength decreases as the aggregate-to-cement ratio increases which complies with the prediction. The R-squared value is 0.8436 which indicates a strong relationship. It is noted that the compressive strength varies little when the aggregate-to-cement ratio is larger than 3 as seen in FIG. 2.

3. Fine-to-Coarse Aggregate Ratio Vs. Compressive Strength

Figure 3:
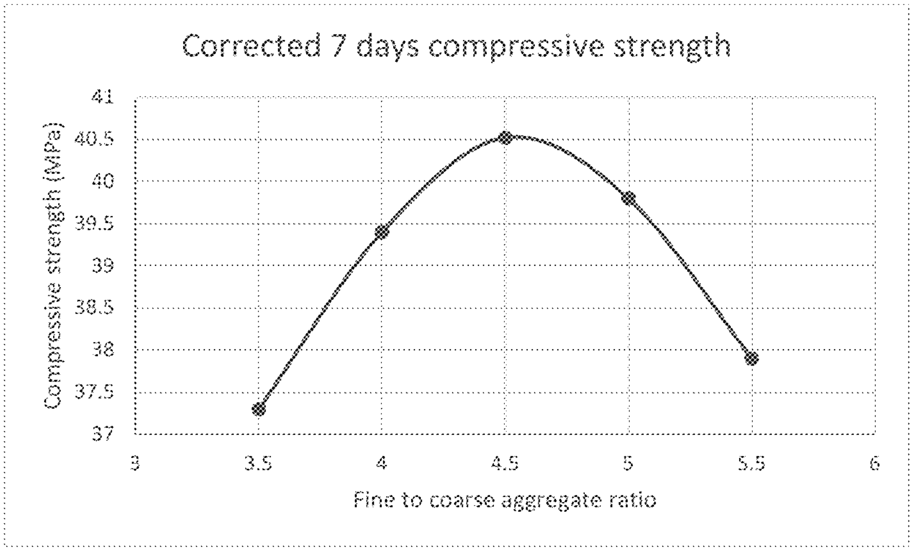
FIG. 3 is a plot of compressive strength vs. the fine to coarse aggregate ratio.

Coarse aggregates have a large area to volume ratio. It is more effective for the binder to connect coarse aggregates. Fine aggregates fill in the voids between coarse aggregates and enhance the interlock strength of the concrete. Table 3 shows five tested compositions to determine the optimum fine-to-coarse aggregate ratio vs. the compressive strength of the concrete. FIG. 3 shows that the optimum fine-to-coarse aggregate ratio for the tested compositions for compressive strength is 4.5. Compressive strength with the fine/coarse ratio in the range from 4.0 to 5.0 fluctuates slightly.

TABLE 3

| Fine to coarse aggregate ratio | | | | | | | | | |
|---|---|---|---|---|---|---|---|---|---|
| | | Aggregate (g) | | | Admixture | | 7 Days | Corrected 7 days |
| | | Fine aggregate | | Coarse | | (g) | Dry | compressive | compressive |
| F/C ratio | Binder (g) OPC SCM | Glass | Coarse sand | aggregate 10 mm | Water (g) | Water reducer | density (kg/m3) | strength (MPa) | strength (MPa) |
| 3.5 | 865 | 489.3 | 1467.8 | 637.9 | 259.5 | 2.8 | 2127.6 | 40.98 | 37.30 |
| 4.0 | 865 | 505.3 | 1515.7 | 574.0 | 259.5 | 2.8 | 2164.1 | 41.73 | 39.40 |
| 4.5 | 865 | 518.3 | 1554.7 | 522.0 | 259.5 | 2.8 | 2182.6 | 46.00 | 40.52 |
| 5.0 | 865 | 529.3 | 1587.7 | 478.0 | 259.5 | 2.8 | 2172.2 | 43.58 | 39.80 |
| 5.5 | 865 | 538.4 | 1615.0 | 441.6 | 259.5 | 2.8 | 2163.1 | 40.08 | 37.90 |

4. Glass Content Vs. Compressive Strength

Glass sand has a similar gradation to fine aggregate. It contains ultra-fine glass (<100 μm) which improves the compressive strength. Further, it optimizes the gradation of aggregates. However, the strength of glass is lower than that of aggregates; glass is also brittle. To identify an optimum glass content, five compositions were selected with different glass contents. Glass content is defined as:

$$\text{Glass content} = \frac{\text{Glass}}{\text{Glass} + \text{Coarse sand}} \text{ by mass.}$$

Figure 4:
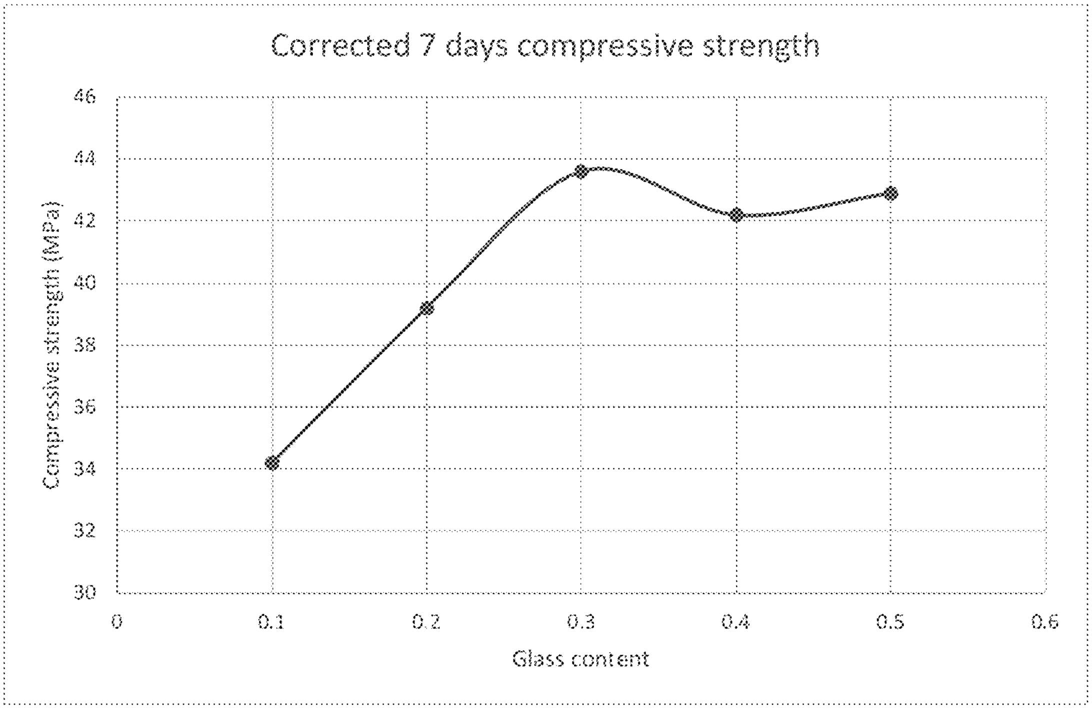
FIG. 4 is a plot of compressive strength vs. glass content.

The compressive strength reaches a peak value when the glass content is 0.3 as seen in FIG. 4. After that, it decreases slowly. By observing the appearance of samples, potholes increase on the surface with an increase in the glass content. Therefore, 0.35 was used as an optimum glass content which can both increase compressive strength and consume glass without defects on the surface.

TABLE 4

| Glass Content | Binder (g) OPC SCM | Aggregate (g) Fine aggregate Glass | Aggregate (g) Fine aggregate Coarse sand | Aggregate (g) Coarse aggregate 10 mm | Water (g) | Admixture (g) Water reducer | Dry density (kg/m3) | 7 Days compressive strength (MPa) | Corrected 7 days compressive strength (MPa) |
|---|---|---|---|---|---|---|---|---|---|
| 0.1 | 889.6 | 210.2 | 1892.0 | 566.6 | 266.9 | 2.8 | 2177.9 | 38.94 | 34.20 |
| 0.2 | 889.6 | 420.5 | 1681.8 | 566.6 | 266.9 | 2.8 | 2196.6 | 47.10 | 39.20 |
| 0.3 | 889.6 | 630.7 | 1471.6 | 566.6 | 266.9 | 2.8 | 2165.1 | 46.18 | 43.60 |
| 0.4 | 889.6 | 840.9 | 1261.4 | 566.6 | 266.9 | 2.8 | 2191.9 | 49.29 | 42.20 |
| 0.5 | 889.6 | 1051.1 | 1051.2 | 566.6 | 266.9 | 2.8 | 2181.9 | 48.27 | 42.90 |

Glass content

Based on the above, a composition for a low efflorescence, high strength paving block includes a cementitious binding material of ordinary Portland cement (OPC), fly ash, calcium sulfoaluminate cement (CSA), ground-granulated blast-furnace slag (GGBS) or mixtures thereof. The composition further includes coarse aggregate; at least 90 percent of the coarse aggregate has a diameter of less than approximately 10 mm. Fine aggregate is provided having a diameter less than approximately 0.75 to 4.75 mm. The composition also includes glass powder having a diameter of less than approximately 75 microns along with water and an optional superplasticizer. In the composition, a ratio of water to cementitious binder material is 0.2 to 0.5 by weight. A ratio of coarse plus fine aggregate to the cementitious binder material is 2 to 6 by weight. The ratio of fine aggregates to coarse aggregates is 2 to 5 by weight and the dry density of formed paving blocks is 1800-2200 kg/m$^3$.

The composition may optionally include a variety of recycled components. For example, recycled fine aggregate may be used (for example, stone fines) as well as recycled coarse aggregate (for example, recycled concrete aggregate). Glass components may also optionally include recycled glass.

In another aspect, the present invention provides an efflorescence-resistant concrete paving block composition having a cementitious binding material of ordinary Portland cement (OPC), fly ash, calcium sulfoaluminate cement (CSA), ground-granulated blast-furnace slag (GGBS) in an amount from 20 to 25 wt. %. Coarse aggregate is provided having a diameter less than approximately 10 mm in an amount from 10 to 15 wt. percent. Fine aggregate is provided having a diameter less than approximately 3 mm in an amount from 32 to 39 wt. %. The composition further includes glass powder having a diameter of less than approximately 75 microns in an amount from 17 to 23 (19.9 being an optimum value) wt. %. Water is present in an amount from 6 to 9 wt. %; and the dry density of formed paving blocks is 1800-2200 kg/m$^3$.

EXAMPLES

The examples relate to determination of low efflorescence compositions using glass powders. The raw materials were analyzed. The 10 mm aggregate contains around 10% fine aggregate which is taken into consideration when calculating the fine to coarse aggregate ratio which is to say:

$$\text{Fine to coarse aggregate ratio} = \frac{M_{Glass} + M_{Sand} + 10\%\ M_{10\ mm}}{90\%\ M_{10\ mm}}$$

Figure 5:
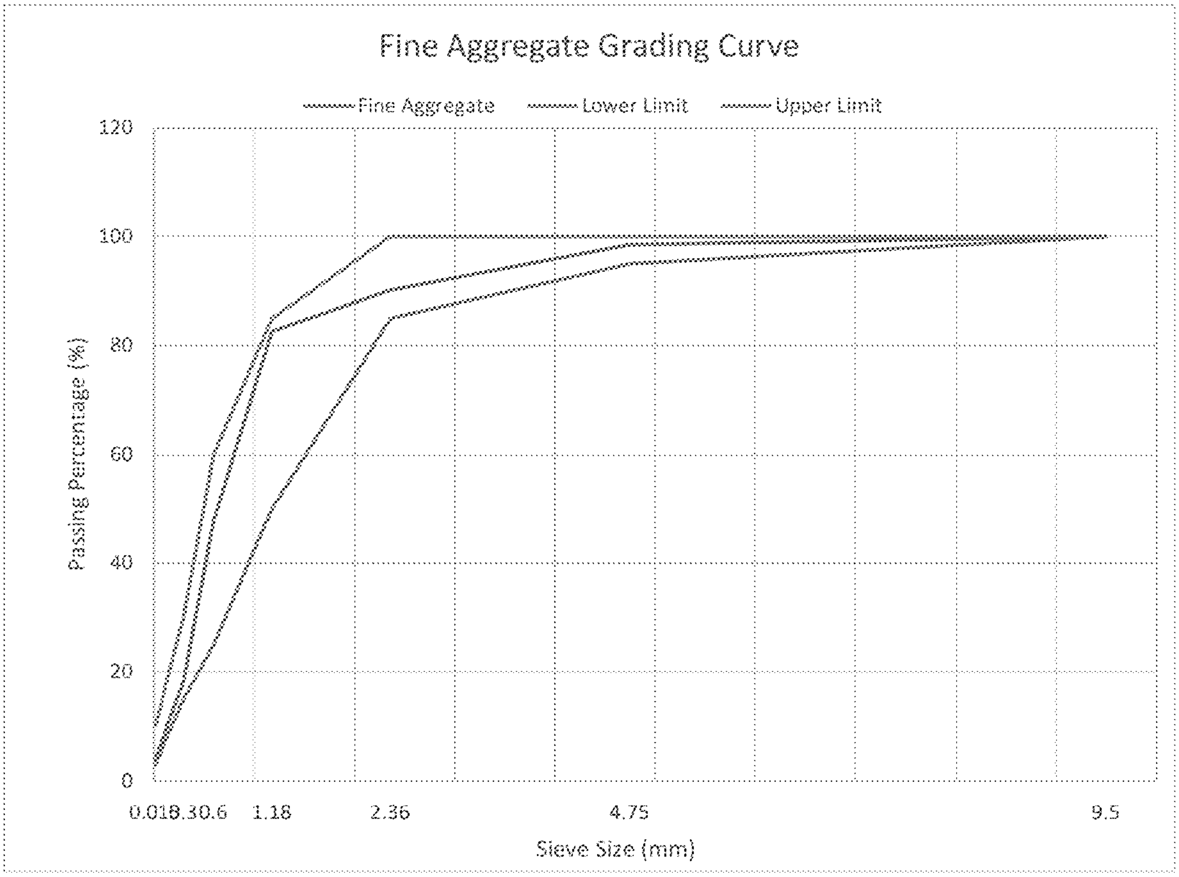
FIG. 5 is a plot of the gradation of fine aggregate.
Figure 6:
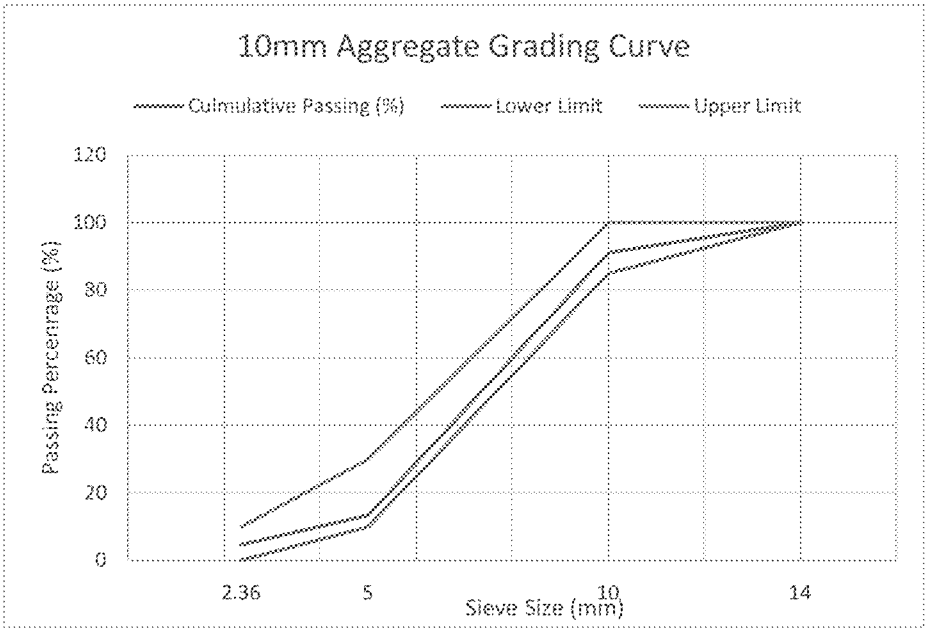
FIG. 6 is a plot of the 10 mm aggregate.

FIG. 5 shows the fine aggregate grading curve. FIG. 6 shows the 10 mm aggregate curve.

Moisture content of solid starting ingredients has an impact on the selection of a particular water-to-cement ratio. In the plant, an operator can measure the water content after mixing. The water-to-cement ratio is used as an index. The moisture in the solid increases the actual water-to-cement ratio.

Recycled glass contains almost no moisture. For the coarse sand and 10 mm aggregate, the following steps are applied to measure the moisture content:

Weigh the sample and put it in the oven.

After 24 hrs, take out the sample and weigh it.

Compare the mass difference and calculate the moisture content.

$$\text{Moisture content} = \frac{\text{Mass after drying} - \text{Mass before drying}}{\text{Mass before drying}}$$

The moisture content of coarse sand is 4.17% while the moisture content of 10 mm aggregate is 1.01%. Therefore, drying oven was used to remove the moisture content of the coarse sand and 10 mm aggregate before mixing.

Sample Preparation

Two methods are used for the preparation of samples. One is to compact material on a vibration table. By controlling the vibration and loading, the height and density are within an accepted range.

The other is to compact material without vibration. The examples use the second method. Without vibration, a very high-density sample may not be obtained.

Compressive Strength Test

An advanced test machine is used to test the compressive strength in the axial direction. The loading rate is set as 15 kN/s. Before compressive strength test, mass and height are measured to calculate the dry density.

Dry Density Vs Compressive Strength

Figure 7:
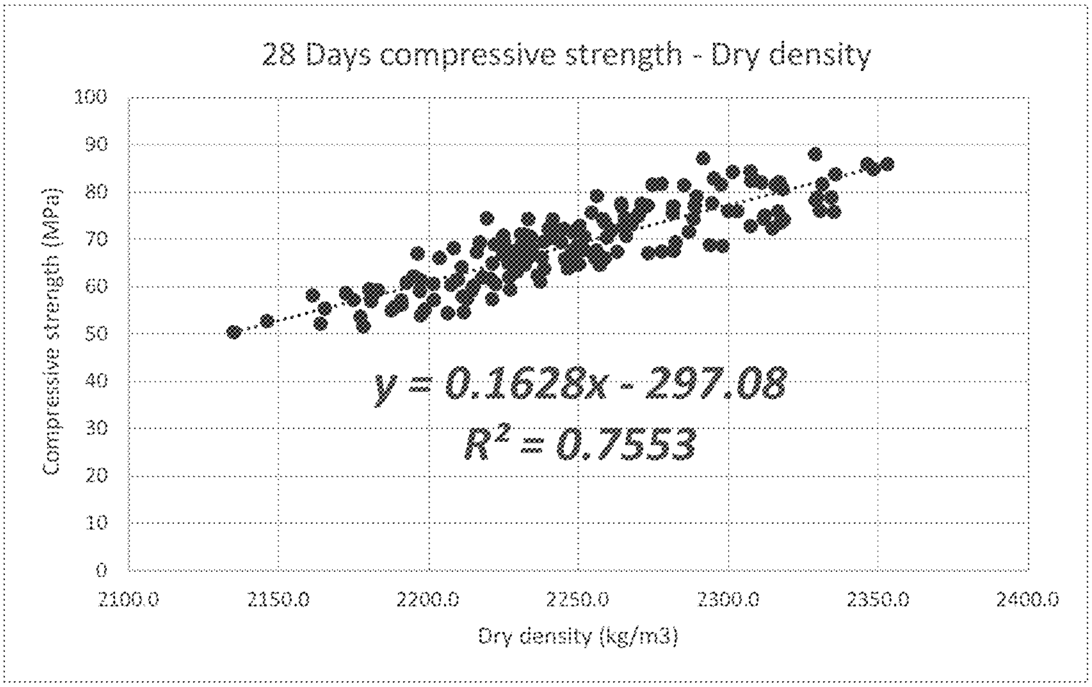
FIG. 7 is a scatter plot of 28 days' compressive strength.

Three batches of 80 mm paving blocks (each batch contains 54 pieces) were analyzed. The average 28-day compressive strength is 69.04 MPa. The maximum 28-day compressive strength is 88.03 MPa. The minimum 28-day compressive strength is 50.4 MPa. Linear regression was used to analyze the relationship between the 28-day compressive strength and the dry density, plotted in FIG. 7. The linear regression equation is Y=0.1628X−297.08. The R-squared value is 0.7753 which is larger than 0.7. Therefore, the dry density is deemed to have a strong correlation to the 28-day compressive strength. Based on the regression equation, the expected dry density should be no less than 2100 kg/m$^3$ to achieve a 45 MPa compressive strength. Considering the variation during commercial production, 2150 kg/m$^3$ was selected as the minimum dry density.

It is noticeable that mass loss occurs after mixing. For example, the weighted mixture may fall out when filling it into the mold. Water evaporation happens during the curing. To predict the accurate value of the dry density, a relationship is built between wet density and dry density. A group of samples was prepared to determine the mass loss rate which is defined as:

$$\text{Mass loss rate} = \frac{\text{Wet mass} - \text{Dry mass}}{\text{Wet mass}}$$

Wet mass: mass of the mixture before filling the material

Dry mass: mass of the paving blocks after curing

After erasing the inaccurate data of Sample 4 and Sample 7, the average mass rate is 2.30%. The designed wet density should be no less than 2200 kg/m$^3$.

TABLE 5

| Mass loss rate | | | | | |
|---|---|---|---|---|---|
| | Wet mass (g) | Dry mass(g) | Mass loss (g) | Mass loss rate | Average mass loss rate |
| 1 | 3600 | 3526.4 | 73.6 | 2.04% | 2.30% |
| 2 | 3400 | 3324.7 | 75.3 | 2.21% | |
| 3 | 3500 | 3411.5 | 88.5 | 2.53% | |
| 4 | 3450 | 3328.8 | 121.2 | ~~3.51%~~ | |
| 5 | 3550 | 3465.7 | 84.3 | 2.37% | |
| 6 | 3550 | 3466.4 | 83.6 | 2.35% | |
| 7 | 3550 | 3416.3 | 133.7 | ~~3.77%~~ | |

Optimum Formula Design

Considering the above factors, a particular optimum formula was determined in Table 6

TABLE 6

| Optimum formula | | | | | | | |
|---|---|---|---|---|---|---|---|
| | | Aggregate (g) | | | | Admixture | |
| | | Fine aggregate | | Coarse | | (g) | Dry |
| | Binder (g) OPC SCM | Glass | Coarse sand | aggregate 10 mm | Water (g) | Water reducer | density (kg/m$^3$) |
| Optimum | 832.7 | 715.3 | 1328.6 | 454.3 | 266.4 | 2.6 | 2150 |

The above formula is based on considerations of highest compressive strength. However, from an environmental and cost standpoint, it is also a target to save 15% Portland cement. Increasing A/C ratio and reducing dry density are two primary methods for cement saving. Based on the optimum formula, six formulas were selected in the lab for performing a compressive strength test. The height should be 80±2 mm and the 28-day compressive strength should be higher than 45 MPa. Generally, the 7-day compressive strength is around 70% of 28-day compressive strength. In the lab, 7-day compressive strength was tested which must be higher than 38.25 MPa (80% of 45 MPa) to be on the safe side.

TABLE 7

| Compressive Strength of Concrete at Various Ages | |
|---|---|
| Age | Strength percent |
| 1 day | 16% |
| 3 days | 40% |
| 7 days | 65% |
| 14 days | 90% |
| 28 days | 99% |

TABLE 8

Formula and results summary (experimental formula)

| | Binder (g) OPC SCM | Aggregate (g) Fine aggregate Glass | Aggregate (g) Fine aggregate Coarse sand | Aggregate (g) Coarse aggregate 10 mm | Water (g) | Admixture (g) Water reducer | Height (mm) | Dry density (kg/m3) | 7-Day compressive strength (MPa) |
|---|---|---|---|---|---|---|---|---|---|
| 1 | 827 | 723.6 | 1343.8 | 413.5 | 289.4 | 2.8 | 80 | 2180 | 51.9 |
| 2 | 827 | 723.6 | 1343.8 | 413.5 | 289.4 | 1.4 | 80.2 | 2173 | 44.9 |
| 3 | 827 | 710.5 | 1319.4 | 451.1 | 289.4 | 1.4 | 80.3 | 2186 | 48.9 |
| 4 | 827 | 710.5 | 1319.4 | 451.1 | 289.4 | 0 | 81.1 | 2156 | 39.5 |
| 5 | 827 | 723.6 | 1343.8 | 413.5 | 289.4 | 0 | 81 | 2158 | 45 |
| 6 | 741.9 | 758 | 1407.7 | 432.8 | 259.7 | 1.4 | 81.3 | 2157 | 47.7 |

Commercial Site Trial

The formula is adjusted according to industrial feedback in a commercial setting. Aggregates are exposed on the ground without covering and no heating process is applied before mixing. The water-to-cement ratio is replaced by water-to-solid ratio displayed on a moisture indicator. It was found that the moisture indicator displays a lower value compared with the real moisture content. According to the record on site, the compositions of Table 9 were tabulated. (Remark: F/C ratio value here take 10% of 10 mm aggregate as fine aggregate).

TABLE 9

Composition and results summary (commercial trial formula)

| | Binder (g) OPC SCM | Aggregate (g) Fine aggregate Glass | Aggregate (g) Fine aggregate Coarse sand | Aggregate (g) Coarse aggregate 10 mm | Water (g) | Admixture (g) Water reducer | A/C ratio | F/C ratio | W/C ratio |
|---|---|---|---|---|---|---|---|---|---|
| 1 | 862.7 | 443.5 | 1526.3 | 530.9 | 234.0 | 2.6 | 2.9 | 4.23 | 0.27 |
| 1* | 822 | 422 | 1453 | 505 | 223 | 2.5 | 2.9 | 4.23 | 0.27 |
| 2 | 827 | 711 | 1320 | 451 | 252.9 | 1.5 | 3 | 5.11 | 0.306 |
| 2* | 790 | 679 | 1261 | 431 | 241.7 | 1.4 | 3 | 5.11 | 0.306 |
| 3 | 747.2 | 763.5 | 1417.8 | 435.9 | 234.0 | 1.5 | 3.5 | 5.67 | 0.313 |
| 3* | 709 | 724 | 1345 | 414 | 222 | 1.4 | 3.5 | 5.67 | 0.313 |
| 4 | 672 | 770 | 1432 | 489 | 218.5 | 1.5 | 4 | 5.11 | 0.325 |
| 4* | 642 | 736 | 1368 | 467 | 208.7 | 1.4 | 4 | 5.11 | 0.325 |
| 5 | 834.9 | 717.8 | 1332.7 | 455.3 | 259.2 | 0 | 3 | 5.11 | 0.31 |

TABLE 10

Composition and results summary (commercial compositions)

| | No. | Height(mm) | Dry density (kg/m$^3$) | 7-Day compressive strength (MPa) |
|---|---|---|---|---|
| Sponsor's | 1 | 79.7 | 2223.3 | 55.4 |
| formula | 1* | 80 | 2146.8 | 49.6 |
| A/C = 3.0 | 2 | 81.3 | 2281.2 | 51.7 |
| | 2* | 81.4 | 2202.2 | 39.9 |
| A/C = 3.5 | 3 | 79.9 | 2180.9 | 49.6 |
| | 3* | 78 | 2117.1 | 42.2 |
| A/C = 4.0 | 4 | 81.1 | 2122.4 | 39.2 |
| | 4* | 77.2 | 2072.1 | 35 |
| A/C = 3.0; No SP | 5 | 80.5 | 2222.4 | 51.5 |

TABLE 11

Commercial trial results summary

| | 7-Day compressive strength (MPa) | 28-Day compressive strength (MPa) | Strength percent | Passing-rate (Compressive strength) | Passing rate (Height) |
|---|---|---|---|---|---|
| 1 | 55.4 | 56.7 | 98% | 100% | 100% |
| 1* | 49.6 | 50.2 | 99% | 91% | 89% |
| 2 | 51.7 | 57.6 | 90% | 86% | 77% |
| 2* | 39.8 | 52.7 | 76% | 86% | 98% |
| 3 | 49.6 | 55.5 | 89% | 100% | 100% |
| 3* | 42.2 | 56 | 75% | 100% | 11% |
| 4 | 39.2 | 44.3 | 88% | 34% | 100% |
| 4* | 35 | 29.6 | 118% | 0% | 100% |
| 5 | 51.5 | 60.4 | 85% | 100% | 98% |

Composition No. 3 shows good properties. The average 28-day compressive strength is larger than 55.5 MPa. All the samples have a 28-day compressive strength more than 45 MPa and have a height within 80±2 mm. It is found that compressive strength at day 7 is around 90% of compressive strength at day 28 in this batch.

Water Absorption Characteristic Test

Since composition No. 3 satisfies the basic requirements, samples of this composition underwent further tests. The samples shall have a characteristic water absorption value not more than 6% by 24-hour cold water immersion method according to AS/NZ S 4456.14: 2003. The average cold water immersion water absorption is 3% showed in Table 12.

TABLE 12

| Characteristic water absorption | | | | | | | | | | |
|---|---|---|---|---|---|---|---|---|---|---|
| Specimen no. | 4 | 5 | 6 | 7 | 8 | 9 | 10 | 11 | 12 | 13 |
| Cold water immersion water absorption (%) | 2.8 | 2.5 | 3.6 | 2.5 | 2.9 | 2.7 | 3.6 | 2.7 | 2.8 | 3.9 |
| Average cold water immersion water absorption (%) | | | | | 3.0 | | | | | |

The skid resistance value should be more than 60 according to the paving block requirements.

The average unpolished slip resistance value is 88 shown in Table 13.

TABLE 13

| Unpolished slip resistance value | | | | | | | | | | | |
|---|---|---|---|---|---|---|---|---|---|---|---|
| Specimen ID. | Recorded individual readings at 0° | | | | | Recorded individual readings at 80° | | | | | Pendulum value |
| 22 | 87 | 88 | 88 | 87 | 87 | 88 | 88 | 87 | 88 | 87 | 88 |
| 23 | 88 | 87 | 87 | 88 | 87 | 87 | 88 | 87 | 88 | 88 | 88 |
| 24 | 87 | 87 | 88 | 88 | 87 | 88 | 88 | 88 | 87 | 87 | 88 |
| 25 | 88 | 87 | 87 | 88 | 88 | 87 | 87 | 88 | 88 | 87 | 88 |
| 26 | 88 | 87 | 87 | 87 | 88 | 87 | 88 | 87 | 87 | 87 | 87 |
| Unpolished slip resistance value (USRV) | | | | | | | | | | | 88 |

The average of compressive strength is 50 MPa and the characteristic compressive strength is 44 MPa shown in Table 14.

TABLE 14

| The characteristic strength | Identification mark | | | | | | | |
|---|---|---|---|---|---|---|---|---|
| | 14 | 15 | 16 | 17 | 18 | 19 | 20 | 21 |
| Lesser dimension of the two plan (L) (mm) | 200 | 200 | 200 | 200 | 200 | 200 | 200 | 200 |
| Nominal height (H) (mm) | 79 | 79 | 79 | 79 | 79 | 79 | 79 | 79 |
| Nominal gross plan area (A) ($mm^2$) | 19800 | 19800 | 19800 | 19800 | 19800 | 19800 | 19800 | 19800 |
| Breaking Load (P) (kN) | 1172 | 995 | 1134 | 994 | 1070 | 1168 | 1008 | 1140 |
| Comprehensive Strength $C = \frac{1000P}{A} \times \frac{2.5}{1.5 + L/H}$ (MPa) | 54 | 46 | 52 | 46 | 49 | 54 | 46 | 52 |
| Square of Compressive Strength $C^2$ ($MPa^2$) | 2883.7 | 2079.4 | 2704.0 | 2079.4 | 2410.8 | 2873.0 | 21344 | 2735.3 |
| The Sum of Square of Compressive Strength $\Sigma C^3$ ($MPa^2$) | | | | 19900 | | | | |
| Average of Compressive Strength $C_m$ (MPa) | | | | 50 | | | | |
| Unbiased Standard Deviation $s = \frac{\sqrt{\sum C^2 - n(C_m)^2}}{n-1}$ (MPa) | | | | 4 | | | | |
| The Characteristic Strength of the Batch $C_c = C_m - 1.65s$ (MPa) | | | | 44 | | | | |

Characterization of Efflorescence

Efflorescence Acceleration and Comparison

According to the testing standard ASTM C67-08 was conducted firstly to evaluate the severity of efflorescence level by the naked eye. Prior to the tests, 5 control samples and 5 experimental samples were prepared, the detailed steps include:

Step 1: Immerse the samples in water having a depth of 25 mm for seven days.

Step 2: Put the sample in the environmental chamber without contact with water for seven days.

Step 3: Drying samples in the drying oven without contact with water for 24 hours.

Step 4: Observe and compare the efflorescence level.

In addition, in order to explore the possibility to accelerate the efflorescence progress in the concrete specimen, the depth of immersed water was raised from 25 mm to 100 mm and the time extended in contact with water from 7 days to 14 days.

Figure 8:
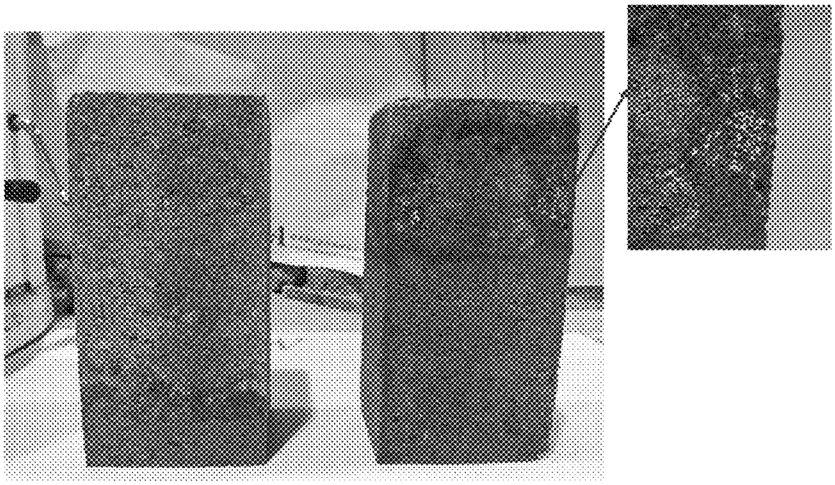
FIG. 8 is a photograph of two samples that have undergone efflorescence testing.

Based on the optimized formula above, specimens were prepared for efflorescence comparison. As shown in the photograph of FIG. 8 almost no white deposit was found in the optimized formula (left) while a white efflorescence deposit leached out in conventional composition (right).

TABLE 15

| Compositions for efflorescence comparison | | | | | | |
|---|---|---|---|---|---|---|
| | Cement | Glass | Sand | 10 mm | Water | SP |
| Conventional composition | 2760.6 | 1419.2 | 4884.2 | 1698.9 | 748.8 | 8.3 |
| Optimized formula | 2256.7 | 2221.9 | 4123.6 | 2114.1 | 803.7 | 4.8 |

Conductivity

According to the mechanism described before, the occurrence of efflorescence is mainly due to soluble ions in the concrete paving blocks. To evaluate the efflorescence potential, specimens were immersed in deionized water to let the soluble ions be diffused to the deionized water, including free calcium, sodium and potassium ions. Conductivity of the immersed solution was measured by conductivity meter, samples were immersed in same containers with the same volume of deionized water, and measured in day 3, day 7 and day 14 until reaching a stable ion concentration.

Figure 9:
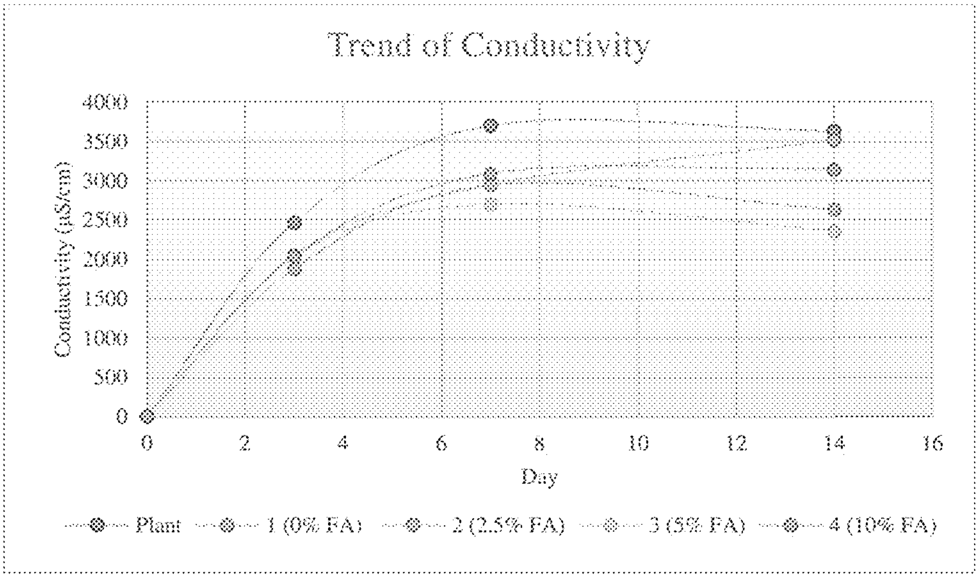
FIG. 9 shows the conductivity of the fly ash group.
Figure 10:
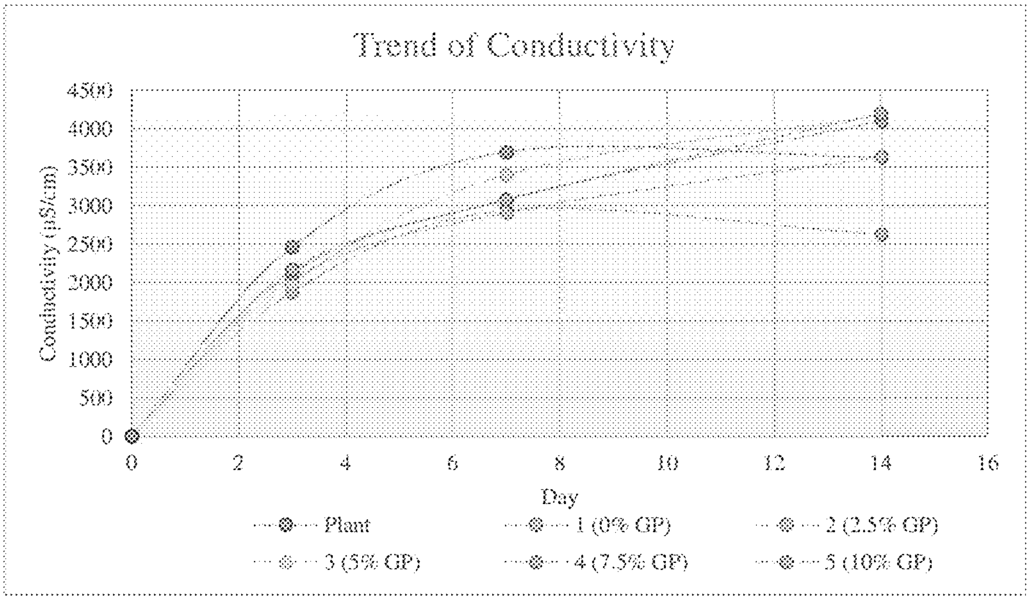
FIG. 10 shows the conductivity of the glass powder group.

Based on the optimized composition, compositions containing fly ash and glass powder in Table 16 were set to measure the conductivity; the corresponding results were showed in FIG. 9 and FIG. 10, respectively.

Generally, the conductivity initially increased within first 7 days then tended to be stable afterwards. Among these groups, the addition of 5% fly ash can reduce as high as 34% in the conductivity.

TABLE 16

Formula for conductivity comparison

| | Cement | FA or GP | Glass | Sand | 10 mm | Water | SP |
|---|---|---|---|---|---|---|---|
| Conventional | 2760.6 | | 1419.2 | 4884.2 | 1698.9 | 748.8 | 8.3 |
| 1 | 2256.7 | | 2221.9 | 4123.6 | 2114.1 | 803.7 | 4.8 |
| 2 | 2200.3 | 56.4 (2.5%) | 2221.9 | 4123.6 | 2114.1 | 803.7 | 6.5 |
| 3 | 2125.9 | 112.8 (5%) | 2221.9 | 4123.6 | 2114.1 | 803.7 | 8 |
| 4 | 1974.7 | 169.2 (7.5%) | 2221.9 | 4123.6 | 2114.1 | 803.7 | 8.5 |
| 5 | 2031.1 | 225.6 (10%) | 2221.9 | 4123.6 | 2114.1 | 803.7 | 9.5 |

As compared to fly ash groups, glass powder performed worse in efflorescence reduction, only 21% in Day 7 in the case of 2.5% glass powder. The conductivity tended to increase after Day 7 (as shown in FIG. 10) which may be caused by high reactivity of ultra-fine glass powder, leading an earlier balance of ion concentration.

Water Absorption

Water absorption indicates the permeability of paving blocks. More pores inside the concrete paving blocks can not only absorb more water, but also create path for soluble ions migrating to the surface of concrete blocks. Additionally, outside water (raindrops and dew) can penetrate easily into the concrete blocks which causes the secondary efflorescence.

To demonstrate the effect of ultrafine glass powder or fly ash, samples were prepared according to the compositions listed in Table 17.

TABLE 17

Compositions for water absorption test

| | Cement | FA or GP | Glass | Sand | 10 mm | Water | SP |
|---|---|---|---|---|---|---|---|
| conventional | 2760.6 | | 1419.2 | 4884.2 | 1698.9 | 748.8 | 8.3 |
| 1 | 2125.9 | 112.8 FA | 2221.9 | 4123.6 | 2114.1 | 803.7 | 9.5 |
| 2 | 2125.9 | 112.8 GP | 2221.9 | 4123.6 | 2114.1 | 803.7 | 9.5 |

It can be seen from Table 18 that the conventional composition had the largest water absorption value among these groups (3.91%) while 5% GP+9.5 g SP formula had the lowest water absorption (2.5%). In addition, glass powder group has a smaller value as compared to the fly ash groups due to the higher reactivity.

TABLE 18

Water absorption test results

| Formula | 1 h | 2.5 h | 5 h | 10 h |
|---|---|---|---|---|
| Sponsor (8.3 g SP) | 3.80% | 3.83% | 3.90% | 3.91 |
| 5% FA + 9.5 g SP | 2.50% | 2.94% | 3.10% | 3.13 |
| 5% GP + 9.5 g SP | 1.83% | 2.27% | 2.43% | 2.50 |

Fly Ash Content:

To further enhance the quality of concrete paving block, in terms of the long-term compressive strength and control the efflorescence, fly ash and glass powder (<75 microns) were proposed to be used in this project. Given the fact that glass powder (<75 microns) can accelerate the cement hydration at early stage, research focus in the supplementary cementitious material was fly ash. Table 19 showed the different replacing ratio of cement by fly ash, from 0 wt. % to 10 wt. % and their corresponding 28 days compressive strength.

TABLE 19

Different replacing ratio and the corresponding 28-day compressive strength

| | Cement | Fly ash | Glass | Sand | 10 mm | Water | SP | 28-Day compressive strength (MPa) |
|---|---|---|---|---|---|---|---|---|
| Mix 1-0% | 2256.7 | 0 | 2221.9 | 4123.6 | 2114.1 | 803.7 | 4.8 | 46 |
| Mix 2-2.5% | 2200.3 | 56.4 | 2221.9 | 4123.6 | 2114.1 | 803.7 | 6.5 | 45.4 |

TABLE 19-continued

Different replacing ratio and the corresponding 28-day compressive strength

| | Cement | Fly ash | Glass | Sand | 10 mm | Water | SP | 28-Day compressive strength (MPa) |
|---|---|---|---|---|---|---|---|---|
| Mix 3-5% | 2125.9 | 112.8 | 2221.9 | 4123.6 | 2114.1 | 803.7 | 8 | 41.1 |
| Mix 4-7.5% | 1974.7 | 169.2 | 2221.9 | 4123.6 | 2114.1 | 803.7 | 8.5 | 40.6 |
| Mix 5-10% | 2031.1 | 225.6 | 2221.9 | 4123.6 | 2114.1 | 803.7 | 9.5 | 44.4 |

As can be concluded from the table, compressive strength decreased with greater replacement of cement due to the low reactivity of fly ash. However, there is no obvious change in the compressive strength. Considering that the compressive strength in last plant trial (44 MPa) was very close to the design strength (45 MPa), compressive strength can be further enhanced by water spraying curing. Hence, substituting cement by fly ash within a certain range (e.g., 5%) can be a promising way to maintain sufficient strength and control the efflorescence.

It should be apparent to those skilled in the art that many modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "include", "including", "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. An efflorescence-resistant concrete paving block formed from an efflorescence-resistant concrete paving block composition, the efflorescence-resistant concrete paving block composition comprising:

a cementitious binding material includes a mixture of ordinary Portland cement (OPC) and fly ash (FA), wherein the concentration of the FA in the mixture is no more than 5 wt. %;

coarse aggregate, wherein at least 90 percent of the coarse aggregate has a diameter of less than approximately 10 mm;

fine aggregate having a diameter of approximately 0.75 to 4.75 mm;

glass powder having a diameter of less than approximately 75 microns;

water; and plasticizer;

wherein a ratio of water to cementitious binder material is 0.2 to 0.5 by weight;

wherein a ratio of coarse plus fine aggregate to cementitious binder material is 2 to 6 by weight;

wherein a ratio of fine aggregates to coarse aggregates is 2 to 5 by weight;

wherein a dry density of formed paving blocks from the composition is 1800-2200 kg/m$^3$;

wherein the glass powder permits a reduction in cement content of the composition, creates a pozzolanic reaction with calcium hydroxide in the composition to form calcium silicate hydrates, which immobilize ions inside the composition, preventing efflorescence formation;

wherein an anti-slip performance British Pendulum Number (BPN) of the paving block is at least 65 or above;

wherein a compressive strength of the paving block exceeds 45 MPa; and wherein the paving block has a rough surface.

2. The efflorescence-resistant concrete paving block of claim 1, wherein the fine aggregates have 40-50% of a particle size within the range of 1.18-2.36 mm and 30-40% of a particle size within the range of 0.3-0.6 mm.

3. The efflorescence-resistant concrete paving block of claim 1, wherein the glass powder is recycled glass powder.

4. The efflorescence-resistant concrete paving block of claim 1, wherein a ratio of water to cementitious binder material is 0.3 to 0.35 by weight.

5. An efflorescence-resistant concrete paving block formed from an efflorescence-resistant concrete paving block composition, efflorescence-resistant concrete paving block composition comprising:

a cementitious binding material in an amount from 20 to 25 wt. %, wherein the cementitious binding material includes a mixture of ordinary Portland cement (OPC) and fly ash (FA), and the concentration of the FA in the mixture is within 5 wt. %;

coarse aggregate having a diameter less than approximately 10 mm in an amount from 10 to 15 wt. percent;

fine aggregate having a diameter of approximately 0.75 to 4.75 mm in an amount from 32 to 39 wt. %;

glass powder having a diameter of less than approximately 75 microns in an amount from 17 to 23 wt. %;

water in an amount from 6 to 9 wt. %; and plasticizer;

wherein the dry density of paving blocks formed from the composition is 1800-2200 kg/m$^3$;

wherein the glass powder permits a reduction in cement content of the composition, creates a pozzolanic reaction with calcium hydroxide in the composition to form calcium silicate hydrates, which immobilize ions inside the composition, preventing efflorescence formation;

wherein an anti-slip performance British Pendulum Number (BPN) of the paving block is at least 65 or above;

wherein a compressive strength of the paving block exceeds 45 MPa; and wherein the paving block has a rough surface.

6. The efflorescence-resistant concrete paving block of claim 5, wherein the fine aggregates have 40-50% of a particle size within the range of 1.18-2.36 mm and 30-40% of a particle size within the range of 0.3-0.6 mm.

7. The efflorescence-resistant concrete paving block of claim 5, wherein the glass powder is recycled glass powder.

8. The efflorescence-resistant concrete paving block of claim 5, wherein a ratio of water to cementitious binder material is 0.3 to 0.35 by weight.

* * * * *